United States Patent [19]

Ueda

[11] Patent Number: 4,956,255
[45] Date of Patent: Sep. 11, 1990

[54] PHOTOSENSITIVE MEMBER
[75] Inventor: Hideaki Ueda, Azuchi, Japan
[73] Assignee: Minolta Camera Kabushiki Kaisha, Osaka, Japan
[21] Appl. No.: 313,469
[22] Filed: Feb. 22, 1989
[30] Foreign Application Priority Data Feb. 23, 1988 [JP] Japan .................. 63-40135

[51] Int. Cl.$^5$ .................. G03G 5/047; G03G 5/06
[52] U.S. Cl. .................. 430/59; 430/58; 430/71; 430/72; 430/76; 430/78; 534/653; 534/657; 534/738; 534/756; 534/758; 534/831
[58] Field of Search .................. 430/58, 59, 71, 72, 430/76, 78

[56] References Cited

U.S. PATENT DOCUMENTS

| 4,032,339 | 6/1977 | Grushkin et al. | |
| 4,062,854 | 12/1977 | Grushkin | 544/208 X |
| 4,123,270 | 10/1978 | Heil et al. | |
| 4,272,598 | 6/1981 | Sasaki et al. | 430/72 |
| 4,396,695 | 8/1983 | Dimmler et al. | 430/59 |
| 4,396,696 | 8/1983 | Nagasaka et al. | 430/78 |
| 4,426,432 | 1/1984 | Sawada et al. | 430/58 |
| 4,533,613 | 8/1985 | Kawamura et al. | 430/78 |
| 4,540,651 | 9/1985 | Fujimaki et al. | 430/72 |
| 4,554,231 | 11/1985 | Ishikawa et al. | 430/59 |
| 4,582,771 | 4/1986 | Ohta | 430/58 |
| 4,631,242 | 12/1986 | Emoto et al. | 430/58 |
| 4,647,520 | 3/1987 | Watanabe et al. | 430/58 |
| 4,663,442 | 5/1987 | Ohta | 534/759 |
| 4,672,149 | 6/1987 | Yoshikawa et al. | 136/263 |
| 4,687,721 | 8/1987 | Emoto et al. | 430/58 |
| 4,716,220 | 12/1987 | Tsutsui | 534/738 |

FOREIGN PATENT DOCUMENTS

| 54-22834 | 2/1979 | Japan . | |
| 55-117151 | 9/1980 | Japan . | |
| 59-214034 | 12/1984 | Japan . | |
| 60-19152 | 1/1985 | Japan . | |
| 60-121451 | 6/1985 | Japan . | |
| 60-151645 | 8/1985 | Japan | 430/76 |
| 62-283344 | 12/1987 | Japan | 430/72 |

Primary Examiner—Roland E. Martin
Attorney, Agent, or Firm—Burns, Doane, Swecker & Mathis

[57] ABSTRACT

The present invention relates to a photosensitive member containing a specific azo compound represented by the following general formula [I];

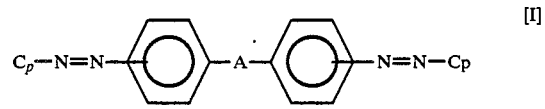

wherein A is a bivalent group of a condensed polycyclic ring which may have a substituent, a pyridine which may have a substituent, a diazine which may have a substituent, a quinoline which may have a substituent, or a benzoazine which may have a substituent; Cp is a residual group of a coupler, which is improved in photosensitive porperties, in particular, sensitivity.

20 Claims, 1 Drawing Sheet

PHOTOSENSITIVE MEMBER

BACKGROUND OF THE INVENTION

This invention relates to a photosensitive member containing a new azo pigment.

Known photosensitive materials for forming a photosensitive member include inorganic photoconductive materials such as selenium, cadmium sulfide or zinc oxide.

These photosensitive materials have many advantages such as low loss of charges in the dark, an electrical charge which can be rapidly dissipated with irradiation of light and the like. However, they have disadvantages. For example, a photosensitive member based on selenium is difficult to produce, has high production costs and is difficult to handle due to inadequate resistivity to heat or mechanical impact. A photosensitive member based on cadmium sulfide or zinc oxide has defects such as its unstable sensitivity in a highly humid environment and loss of stability with time because of the deterioration of dyestuffs, added as a sensitizer, by corona charge and fading with exposure.

Many kinds of organic photoconductive materials such as polyvinylcarbazole and so on have been proposed. These organic photoconductive materials have superior film forming properties, are light in weight, etc., but inferior in sensitivity, durability and environmental stability compared to the aforementioned inorganic photoconductive materials.

Various studies and developments have been in progress to overcome the above noted defects and problems. A function-divided photosensitive member of a laminated or a dispersed type has been proposed, in which charge generating function and charge transporting function are divided by different layers or different dispersed materials. The function-divided photosensitive member can be a highly efficient photosensitive member in electrophotographic properties such as chargeability, sensitivity, residual potential, durability with respect to copy and repetition, because most adequate materials can be selected from various materials. Further, function-divided photosensitive members have high productivity and low costs, since they can be prepared by coating, and suitably selected charge generating materials can freely control a region of photosensitive wavelength. Illustrative examples of such charge generating materials are organic pigments or dyes such as phthalocyanine pigment, cyanine pigment, polycyclic quinone pigment, perylene pigment, perinone pigment, indigo dye, thioindigo dye, squarain compounds, etc., and inorganic materials such as selenium, selenium-arsenic, selenium-tellurium, cadmium sulfide, zinc oxide, amorphous silicon, etc.

However, photosensitive members, which satisfy general electrostatic property requirements are not produced easily, and photosensitive members having more improved sensitivity are desired.

SUMMARY OF THE INVENTION

The object of the invention is to provide a photosensitive member having excellent general electrostatic properties, in particular, sensitivity.

The present invention relates to a photosensitive member wherein a photosensitive layer comprising an azo pigment represented by the general formula [I] is formed on or over an electrically conductive substrate;

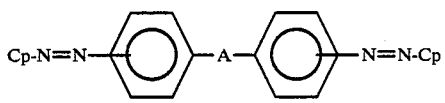

wherein A is a bivalent group of a condensed polycyclic ring which may have a substituent, a pyridine which may have a substituent, a diazine which may have a substituent, a quinoline which may have a substituent, or a benzodiazine which may have a substituent; Cp is a residual group of a coupler.

DETAILED DESCRIPTION OF THE INVENTION

Figure 1:
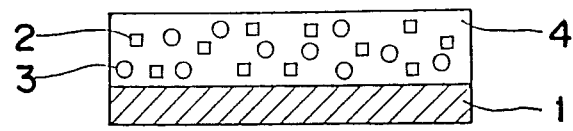
FIG. 1 is a diagram showing the structure of a dispersion-type photosensitive member embodying the invention comprising a photosensitive layer formed on an electrically conductive substrate.

The present invention provides a photosensitive member, having excellent electrophotographic properties, in particular, sensitivity.

The present invention has accomplished the above object by the introduction of a specific azo pigment into a photosensitive member as a charge generating material.

A photosensitive member provided according to the present invention comprises a specific azo compound represented by the following formula [I]

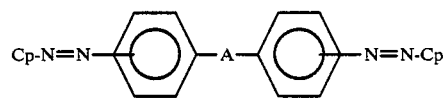

wherein A is a bivalent group of a condensed polycyclic ring which may have a substituent, a pyridine which may have a substituent, a diazine which may have a substituent, a quinoline which may have a substituent, or a benzodiazine which may have a substituent; Cp is a residual group of a coupler.

An azo pigment of the invention represented by the general formula [I] can be synthesized according to a known method. For example, a diamino compound represented by the following general formula [XII];

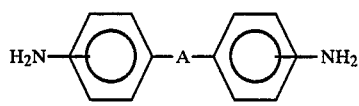 [XII]

wherein A is the same as the formula [I] may be reacted with sodium nitrite in hydrochloric acid to give an azo compound, which may be coupled with an appropriate coupler represented by the following general formula [II]–[XI] in the presence of alkali. In a further method, the azo compound may be prepared by altering a diamino compound to an azo compound, isolating it by an addition with an acid such as $HBF_4$, and then subjecting to coupling reaction The coupling reaction is carried out generally for between 1 hour and 10 hours at the temperature of 30–25° C. or less in water and/or an organic solvent such as water and/or N,N-dimethylformamide according to a known method.

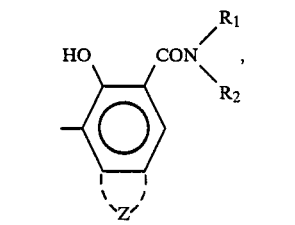 [II]

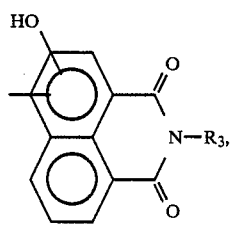 [III]

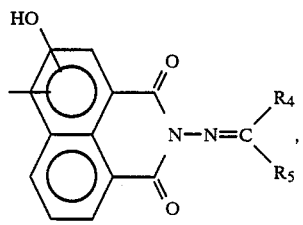 [IV]

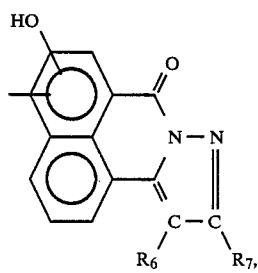 [V]

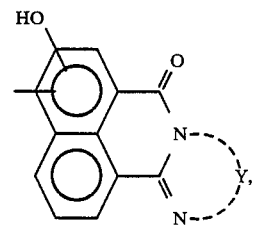 [VI]

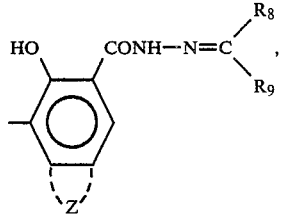 [VII]

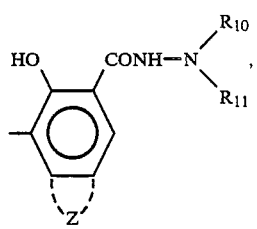 [VIII]

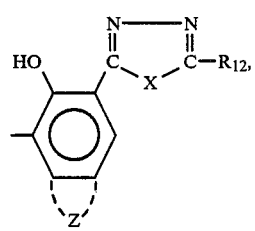 [IX]

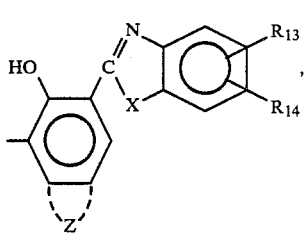 [X]

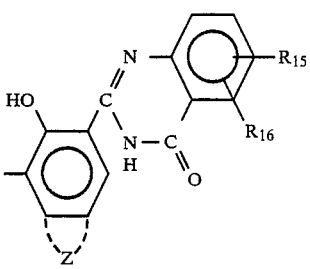 [XI]

wherein X is oxygen, sulfur or substituted or unsubstituted nitrogen atom; Y is a bivalent group of aromatic hydrocarbon or a bivalent group which may form a heterocyclic ring together with nitrogen atoms; Z is a residual group which may be condensed with benzene ring to form a conjugated polycyclic ring or a heterocyclic ring; $R_1$, $R_2$, $R_4$, $R_5$, $R_8$, $R_9$, $R_{10}$ and $R_{11}$ are hydrogen atom, an aralkyl group, an aryl group, or a heterocyclic group, each of which may have a substituent and form a ring with each other; $R_3$ and $R_{12}$ are independently an alkyl group, an aralkyl group, an aryl group or a heterocyclic group, each of which may have a substituent; $R_6$, and $R_7$ are hydrogen atom, halogen atom, or an alkyl group, an aralkyl group, an acyl group, an alkoxycarbonyl group, an aryl group, a condensed polycyclic group or a heterocyclic group, each of which may have a substituent; $R_{13}$, $R_{14}$ and $R_{15}$, $R_{16}$ are hydrogen atom, halogen atom, an alkyl group, a nitro group, substituted sulfone group, a carbamoyl group which may have a substituent on the nitrogen atom, a sulfamoyl group, C-acylamino group which may have a substituent or phthal imidyl group; $R_{13}$, $R_{14}$ and $R_{15}$, $R_{16}$ may form a ring with each other.

In particular, a preferred coupler is the one represented by the foregoing general formula [II], [IV], [VII], [VIII] or [IX] wherein $R_1$, $R_4$, $R_8$, $R_{10}$ are hydrogen, $R_2$, $R_5$, $R_9$, $R_{11}$, $R_{12}$ are the substituted phenyl group of the following general formula,

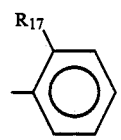

wherein $R_{17}$ is selected from the group consisting of halogen, nitro, cyano, trinitro-fluoromethyl.

A preferred coupler component of the invention is shown below by chemical formulae [1]–[30], but with no significance in restricting the embodiments of the invention.

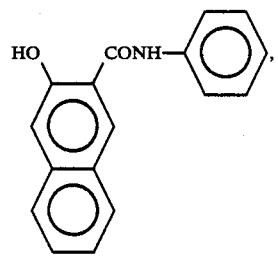

[1]

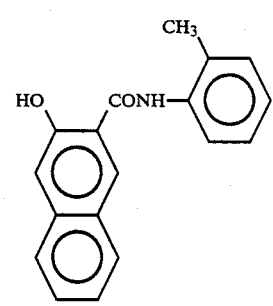

[2]

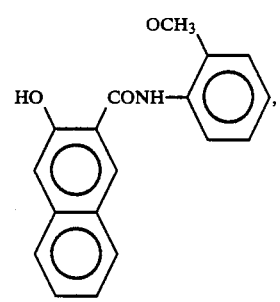

[3]

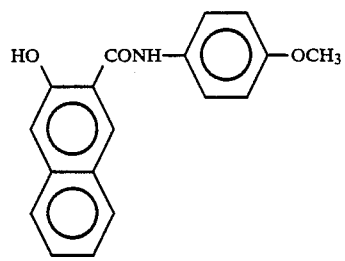

[4]

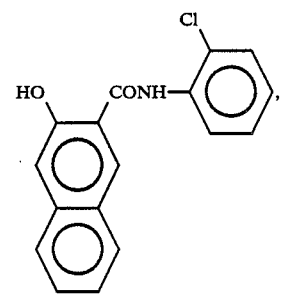

[5]

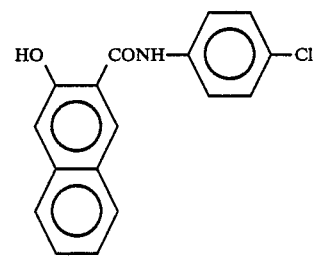

[6]

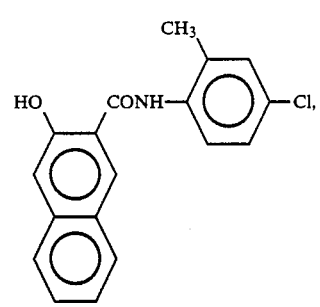

[7]

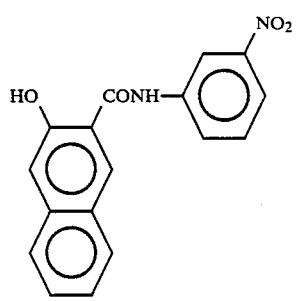

[8]

-continued
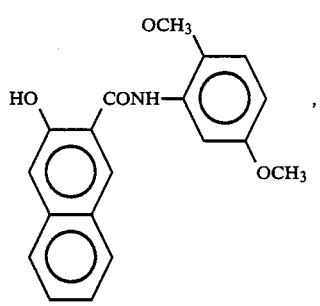
[9]
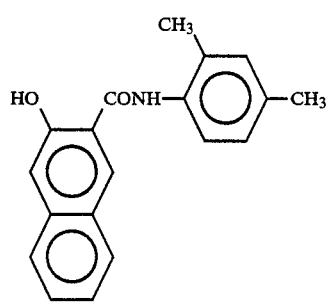
[10]
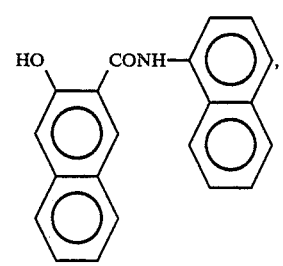
[11]
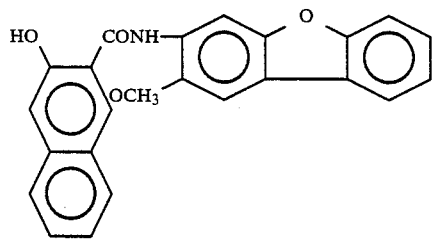
[12]
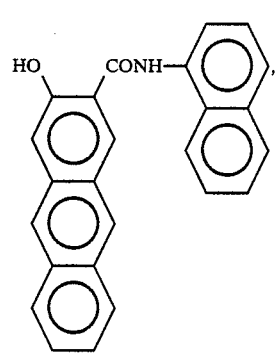
[13]
-continued
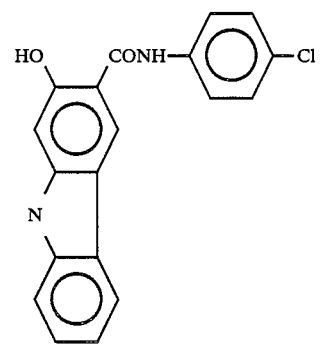
[14]
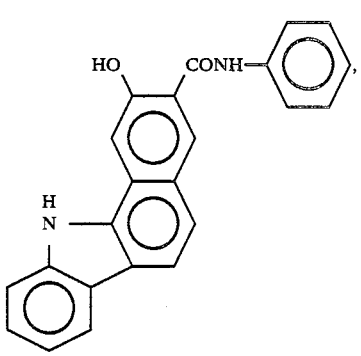
[15]
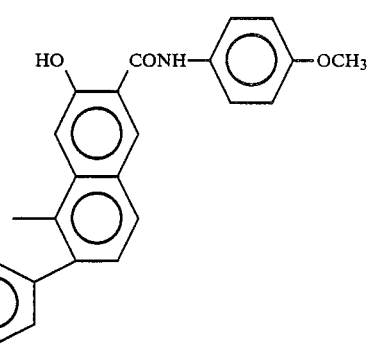
[16]
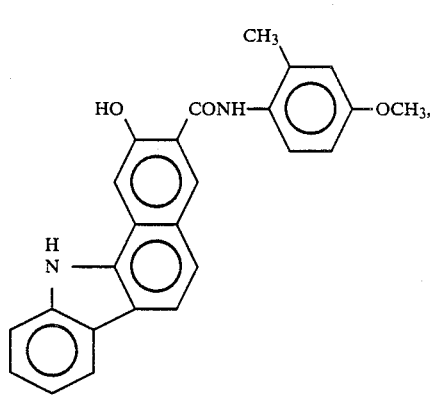
[17]

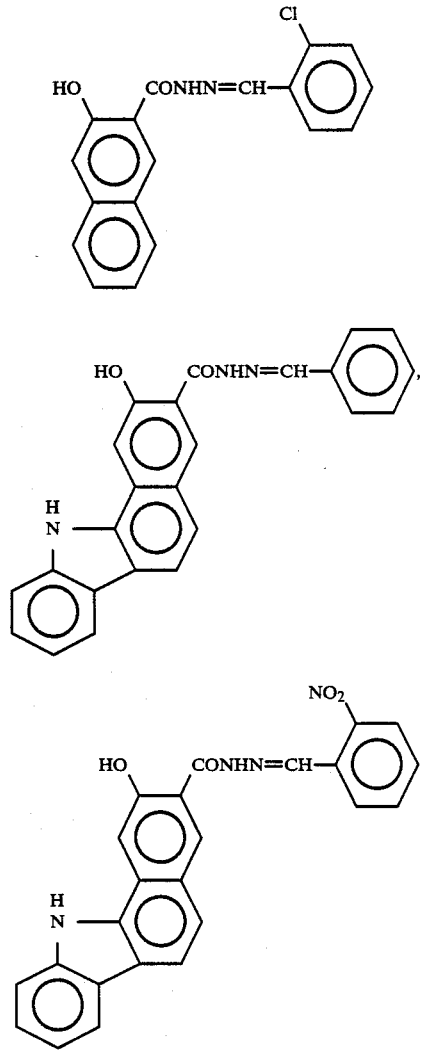
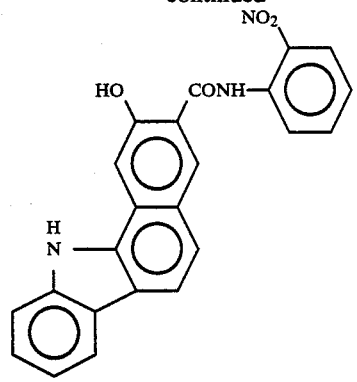
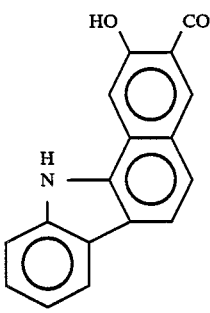
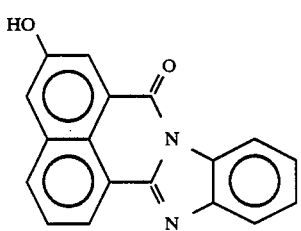
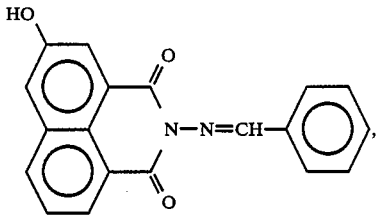
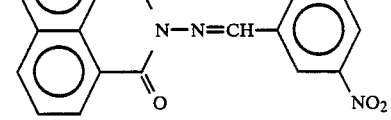
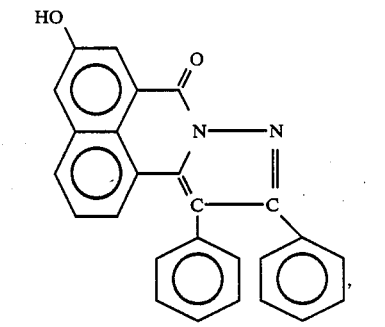
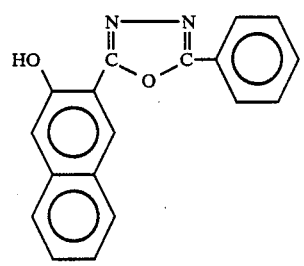

-continued

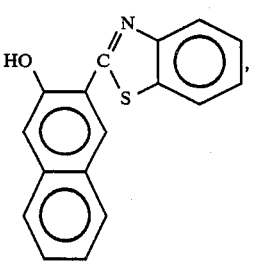

[29]

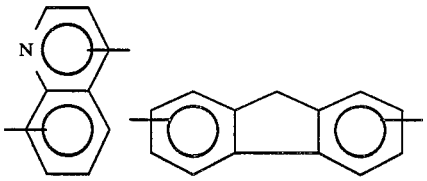

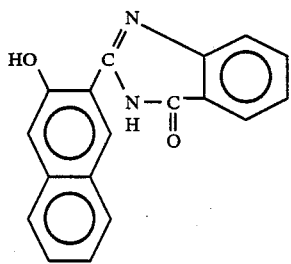

[30]

The A component in the general formula [I] may be exemplified by the ones as described below, with no significance in restricting the embodiment of the invention.

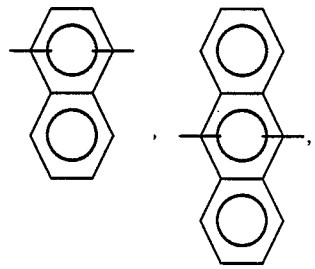

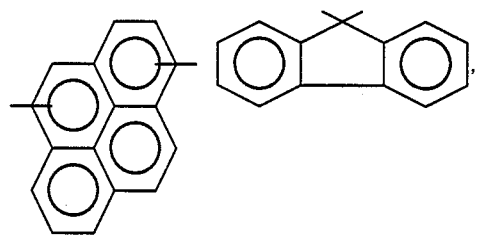

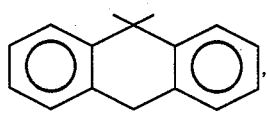

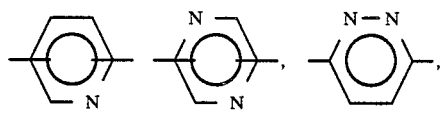

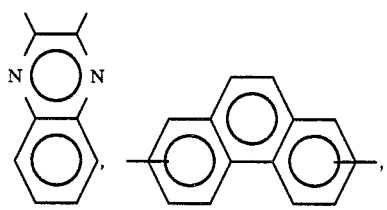

A photosensitive member of the invention has a photosensitive layer comprising one or more kinds of azo compounds of the general formula [I] which is prepared as aforementioned, and the photosensitive layer is formed on or over an electrically conductive substrate.

An azo pigment in a photosensitive member of the invention functions as a photoconductive material and generates charges with very high efficiency by absorbing light resulting in the improvement of sensitivity of a photosensitive member. The generated charges may be transported with an azo pigment as a medium, but more effectively with a charge transporting material as a medium.

An electrically conductive substrate is exemplified by a sheet or a drum made of metal or alloy such as copper, aluminium, silver, iron, and nickel; a substrate such as a plastic film on which the foregoing metal or alloy is adhered by a vacuum-deposition method or an electroless plating method and the like; a substrate such as a plastic film and paper on which an electro- conductive layer is formed by applying or depositing electroconductive polymer, indium oxide, tin oxide etc.

A photosensitive member, various types of which are known, may be any type in the invention.

Figure 2:
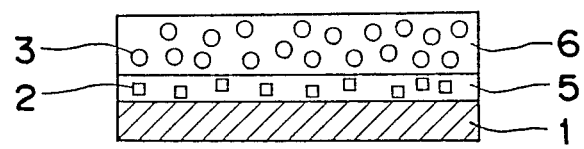
FIG. 2 is a diagram showing the structure of a photosensitive member of the function-divided type comprising a charge generating layer and a charge transporting layer which are formed on an electrically conductive substrate.
Figure 3:
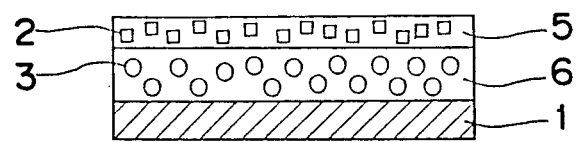
FIG. 3 is a diagram showing the structure of a member of another photosensitive member of the function-divided type comprising a charge generating layer and a charge transporting layer which are formed on an electrically conductive substrate.

For example, a photosensitive member of the invention may be a monolayer type as shown in FIG. 1 in which a photosensitive layer (4) is formed on an electrically conductive substrate (1) by dispersing a photoconductive material (2) and a charge transporting material (3) in a binder resin,; a laminated type as shown in FIG. 2 in which a photosensitive layer is a function divided type and formed by laminating a charge generating layer (5) containing the photoconductive material (2) on the electrically conductive substrate (1) and then laminating a charge transporting layer (6) containing the charge transporting material (3) is formed on the charge generating layer (5); a laminated type contrary to FIG. 2 as shown in FIG. 3 in which a photosensitive layer is a function divided type and formed by laminating the charge transporting layer (6) containing the charge transporting material (3) on the electrically conductive substrate (1) and then laminating the charge generating layer (5) containing the photoconductive material (2) on the charge transporting layer (6).

Figure 4:
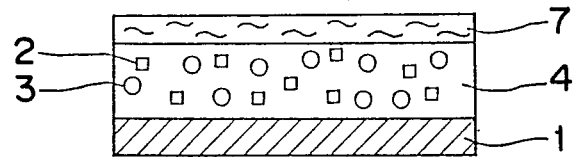
FIG. 4 is a diagram showing the structure of another dispersion-type photosensitive member comprising a photosensitive layer and a surface protective layer formed on an electrically conductive substrate.
Figure 5:
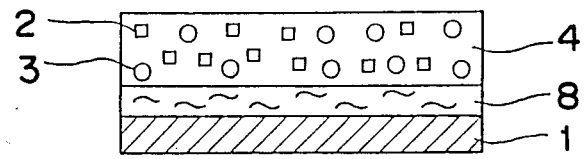
FIG. 5 is a diagram showing the structure of another dispersion-type photosensitive member comprising a photosensitive layer and an intermediate layer formed on an electrically conductive substrate.

A photosensitive layer may have a surface protective layer (7) on the photosensitive layer (4) as shown in FIG. 4, and an intermediate layer (8) between the electrically conductive substrate (1) and the photosensitive layer (4) as shown in FIG. 5. The formation of the intermediate layer as shown in FIG. 5 effects adhesivity and coatability between the electrically conductive substrate and the photosensitive layer, protection of the electrically conductive substrate, and improvement of charge injection from the electrically conductive substrate to the photoconductive layer. A photosensitive member of the foregoing laminated and function-divided type may have the above mentioned surface protective layer or intermediate layer.

First, a photosensitive member of monolayer type as shown in FIG. 1 is explained for its formation.

In order to form a photosensitive member of a monolayer type, fine particles of azo pigments represented by the foregoing general formula [I] are dispersed in a resin solution or a solution containing a charge transporting compound and resin, which is sprayed on the electrically conductive substrate and dried. The thickness of the photosensitive layer is 3–30 μm, preferably 5–20 μm. The amount of an azo pigment contained in the photosensitive layer is within the range of 0.01–3 parts by weight, preferably, 0.2–2 parts by weight on the basis of one part by weight of resin. If a charge transporting material such as polyvinylcarbazole, which is capable of being used as a binder itself, is used, an additional amount of an azo pigment is preferably 0.01–0.5 parts by weight on the basis of one part by weight of charge transporting materials.

And then, a photosensitive member of laminated type as shown in FIG. 2 is explained for its formation.

In order to form a photosensitive member of a laminated type, an azo pigment is deposited in a vacuum on an electrically conductive substrate, an azo pigment is dissolved in an amine-containing solvent to apply onto an electrically conductive substrate or an application solution containing a pigment and, if necessary, binder resin dissolved in an appropriate solvent is applied onto an electrically conductive substrate to be dried, for the formation of a charge generating layer on the electrically conductive substrate. Then, a solution containing a charge transporting material and a binder is applied onto the charge generating layer followed by drying for the formation of a charge transporting layer. The thickness of the azo pigment-containing layer as a charge generating layer is 4 μm or less, preferably, 2 μm or less. It is suitable that the charge-transporting layer has a thickness in the range 3–30 μm, preferably 5–20 μm, and the proportion of charge transporting materials in the charge-transporting layer is 0.2–2 parts by weight, preferably 0.3–1.3 parts by weight on the basis of one part by weight of the binder. There is no need to use a binder when the charge-transporting material is of a high-polymer which is capable of serving as a binder itself.

Some examples of suitable binders for the production of a photosensitive member are thermoplastic resins such as saturated polyester, polyamide, acrylic, ethylene-vinyl acetate copolymer, ion cross-linked olefin copolymer (ionomer), styrene-butadiene block copolymer, polycarbonate, vinyl chloride-vinyl acetate copolymer, cellulose ester, polyimide, styrol, etc., and thermosetting resins such as, epoxy, urethane, silicone, phenolic, melamine, xylene, alkyd, thermosetting acrylic, etc., and photocuring resins, and photoconductive resins such as poly-N-vinyl carbazole, polyvinyl pyrene, polyvinyl anthracene, polyvinylpyrrole, etc., all named without any significance of restricting the use to them. Any of these resins can be used singly or in combination with other resins. It is desirable for any of these electrically insulative resins to have a volume resistance of $1 \times 10^{12}$ Ω·cm or more when measured singly.

A photosensitive member of the present invention permits, in combination with the binder, the use of a plasticizer, such as halogenated paraffin, polybiphenyl chloride, dimethyl naphthalene, dibutyl phthalate or 0-terphenyl, the use of an electron-attractive sensitizer, such as chloranyl, tetracyanoethylene, 2,4,7-trinitrofluorenone, 5,6-dicyanobenzoquinone, tetracyanoquinodimethane, tetrachlorphthalic anhydride, or 3,5-dinitrobenzoic acid, and the use of a sensitizer, such as methyl violet, rhodamine B, cyanine dye, pyrylium salt, and thiapyrylium salt. Applicable as a binder in the practice of this invention are any of the thermoplastic resins and thermosetting resins which are publicly known to be electrically insulative and any of the photocuring resins and photoconductive resins.

Illustrative examples of charge transporting materials for use in a photosensitive member, if necessary, are hydrazone compounds, pyrazoline compounds, styryl compounds, triphenylmethane compounds, oxadiazol compounds, carbazole compounds, stilbene compounds, enamine compounds, oxazole compounds, triphenylamine compounds, tetraphenylbenzidine, azine compounds and the like, including carbazole, N-ethylcarbazole, N-vinylcarbazole, N-phenylcarbazole, tethracene, chrysene, pyrene, perylene, 2-phenylnaphthalene, azapyrene, 2,3-benzochrysene, 3,4-benzopyrene, fluorene, 1,2-benzofluorene, 4-(2-fluorenylazo)resorcinol, 2-p-anisolaminofluorene, p-diethylaminoazobenzene, cadion, N,N-dimethyl-p-phenylazoaniline, p-(dimethylamino)stilbene, 1,4-bis(2-methylstyryl)benzene, 9-(4-diethylaminostyryl) anthracene, 2,5-bis(4-diethylaminophenyl)-1,3,5-oxadiazole, 1-phenyl-3-(p-diethylaminostyryl)-5-(p-diethylaminophenyl)pylazoline, 1-phenyl-3-phenyl-5-pylazolone, 2-(m-naphtyl)-3-phenyloxazole, 2-(p-diethylaminostyryl)-6-dietylaminobenzoxazole, 2-(p-diethylaminostyryl)-6-dietylaminobenzothiazole, bis(4-diethylamino-2-methylphenyl)phenylmethane, 1,1-bis(4-N,N-diethylamino-2-ethylphenyl)heptane, N,N-diphenylhydrazino-3-methylidene-10-ethylphenoxazine, N,N-diphenylhydrazino-3-methylidene-10-ethylphenothiazine, 1,1,2,2-tetrakis-(4-N,N-diethylamino-2-ethylphenyl)ethane, p-diethylaminobenzaldehyde-N,N-diphenylhydrazone, p-diphenylaminobenzaldehyde-N,N-diphenylhydrazone, N-ethylcarbazole-N-methyl-N-phenylhydrazone, p-diethylaminobenzaldehyde-N-α-naphthyl-N-phenylhydrazone, p-diethylaminobenzaldehyde-3-methylbenzothiazolinone-2-hydrazone, 2-methyl-4-N,N-diphenylamino-β-phenylstilbene, α-phenyl-4-N,N-diphenylaminostilbene, bis(diethylaminophenyl)diphenylbutadiene and the like. Any of these charge transporting materials can be used singly or in combination with other charge transporting materials.

A surface protective layer as shown in FIG. 4 may be formed with polymer itself such as acrylic resin, polyaryl resin, polycarbonate resin and urethane resin, or formed by dispersing a material with low electroconductive material such as tin oxide, indium oxide. A deposited layer of aluminium oxide, zinc oxide, silicon oxide and the like may be applied to the layer. Organic plasma polymerized layer can be also applied and it may contain oxygen, nitrogen, halogen, atoms of Group III or V in the Periodic Table if necessary. The thickness of a surface protective layer is desirably 5 μm or less. When an intermediate layer as shown in FIG. 5 is formed, examples of suitable materials contained in these layers are polyimide, polyamide, nitrocellulose, polyvinyl butyral, polyvinyl alcohol, aluminium oxide and the like. It is preferable that the thickness of the layer is 1 μm or less.

An azo compound represented by the foregoing general formula [I] is effective, in particular, as a charge generating material used in a laminated-type photosensitive member.

SYNTHETIC EXAMPLE

In this Synthetic Example, the method of producing the azo pigment of the formula [I] wherein A is

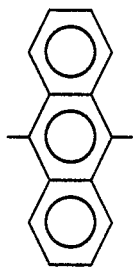

and the coupler component is the one shown by the foregoing chemical formula [1] is explained. The other azo pigments of the general formula [I] can be synthesized similarly as described below.

First, the compound of the formula (a) below;

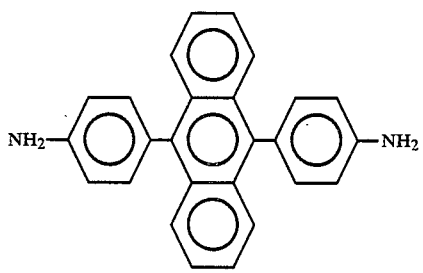
(a)

of 3.61 g (0.01 mole) was dispersed in hydrochloric acid (100 ml). The dispersion was stirred and cooled to 5° C., followed by the addition of an aqueous solution of sodium nitrite (1.4 g) in water (20 ml). Further, the mixture, being stirred, was cooled for one hour, and then filtered. Borofluoric acid (10 g) was added to the filtrate, and then crystals were grown. The obtained crystals were filtered to give tetrafluoroborate of diphenyl anthracene.

Then, the resultant diazonium salt (5.63 g, 0.01 mole) and the coupling agent (6.10 g) represented by the above coupling component [1] were dissolved in N-methylpyrrolidone (300 ml), to which a solution of sodium acetate (5g) dissolved in water (100 ml) was added at 10–20° C. for about 30 minutes. After addition, the solution was further stirred at room temperature for 3.0 hours to filtrate deposited crystals.

The resultant crystals were dispersed in DMF (1 liter), and the solution was stirred at room temperature for 3.0 hours, followed by filtration of the crystals. This operation was repeated two more times. Then, the crystals were washed with water and dried to give 7.8 g (85.9% of yield) of disazo pigment. Thus obtained bisazo pigments are red crystals.

The bisazo pigments were subjected to elemental analysis to compare the found value (%) with calculated values (%) of each element. The results were shown in Table 1.

TABLE 1

| element | elemental analysis | | |
|---|---|---|---|
| | C | H | N |
| found (%) | 78.90 | 4.29 | 9.31 |
| calcd. (%) | 79.30 | 4.41 | 9.25 |

EXAMPLE 1

The example used the bisazo compound as an azo pigment of the formula [I] wherein the A component was

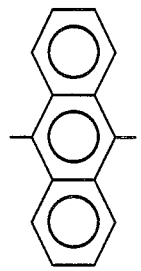

and Cp was represented by the chemical formula [1].

The bisazo compound of 0.45 part by weight, 0.45 part by weight of polyester resin (Vylon 200 made by TOYOBO K.K.) and 50 part by weight of cyclohexanone were taken in Sand grinder for dispersion. The dispersion solution of the bisazo pigment was applied onto aluminotype-Mylar of 100 μm in thickness by a film applicator to form a charge generating layer so that a thickness of the dried layer would be 0.3 g/m$^2$. Then a solution of 70 parts by weight of p-diphenylaminobenzaldehyde-N,N-diphenylhydrazone and 70 parts by weight of polycarbonate resin (K-1300; made by TEIJIN KASEI K.K.) dissolved in 400 parts by weight of dioxane was applied onto the above formed charge generating layer to form a charge transporting layer so that the thickness of the dried layer would be 16 μm. Thus, a photosensitive member with two layers as a photosensitive layer was prepared.

An exposure value for half reducing ($E_{\frac{1}{2}}$) was measured to evaluate sensitivity on the resultant photosensitive member. The exposure value for half reducing, which is the exposure amount required for the surface potential to be half the value of the initial surface potential, is measured by first charging a photosensitive member by means of a corona-discharge of −6.5 KV in the dark and then exposing the member to white light of 5 lux in illuminance.

The obtained result was shown in Table 2 below;

EXAMPLES 2-10

Photosensitive members with two layers as a photosensitive layer were prepared in a manner similar to Example 1, except that azo pigments wherein the A component, and the coupler component Cp were those shown in Table 2. Cp is represented by the foregoing number [1]–[30] of the chemical formula. The resultant photosensitive members were estimated on exposure values for half reducing ($E_{\frac{1}{2}}$) in a similar manner to Example 1. The results were shown in Table 2.

TABLE 2

| Example | A | Cp | E½ (lux·sec) |
|---|---|---|---|
| 1 | (anthracene-like structure) | 1 | 5.2 |
| 2 | (anthracene-like structure) | 2 | 4.8 |
| 3 | (anthracene-like structure) | 10 | 4.3 |
| 4 | (anthracene-like structure) | 15 | 4.1 |
| 5 | (anthracene-like structure) | 17 | 4.5 |
| 6 | (anthracene-like structure) | 21 | 4.3 |
| 7 | (anthracene-like structure) | 23 | 4.0 |
| 8 | (anthracene-like structure) | 25 | 4.8 |
| 9 | (anthracene-like structure) | 27 | 4.5 |
| 10 | (anthracene-like structure) | 30 | 5.0 |

EXAMPLES 11–20

Photosensitive members with two layers as a photosensitive layer were prepared in a manner similar to Example 1, except that azo pigments wherein the A component, and the coupler component Cp were those shown in the following Table 3 were used in charge generating layers, and the charge transporting material of α-phenyl-4-N,N-diphenylaminostilbene was used in a charge transporting layer. Cp is represented by the foregoing number [1]–[30] of the chemical formula. The resultant photosensitive members were estimated on exposure values for half reducing ($E_{\frac{1}{2}}$) in a similar manner to Example 1. The results were shown in Table 3.

TABLE 3

| Example | A | Cp | $E_{\frac{1}{2}}$ (lux · sec) |
|---|---|---|---|
| 11 | 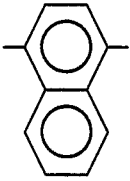 | 2 | 5.2 |
| 12 | 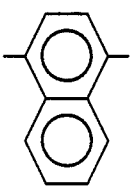 | 10 | 4.8 |
| 13 | 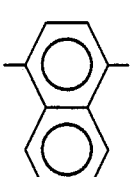 | 13 | 5.0 |
| 14 | 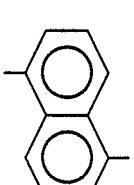 | 15 | 4.5 |
| 15 | 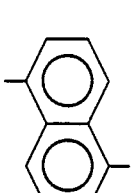 | 21 | 4.7 |
| 16 | 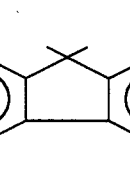 | 2 | 5.3 |
| 17 | 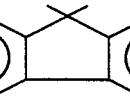 | 10 | 4.9 |
| 18 | 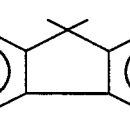 | 15 | 5.0 |

TABLE 3-continued

| Example | A | Cp | $E_{\frac{1}{2}}$ (lux · sec) |
|---|---|---|---|
| 19 | 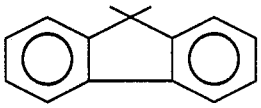 | 19 | 5.0 |
| 20 | 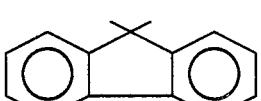 | 23 | 5.2 |

EXAMPLES 21–30

Photosensitive members with two layers as a photosensitive layer were prepared in a manner similar to Example 1, except that azo pigments wherein the A component, and the coupler component Cp were those shown in the following Table 4 were used in charge generating layers, and the charge transporting material of N-ethylcarbazole-3-aldehyde-N-methyl-N-phenylhydrazone was used in a charge transporting layer. Cp is represented by the foregoing number [1]–[30] of the chemical formula. The resultant photosensitive members were estimated on exposure values for half reducing ($E_{\frac{1}{2}}$) in a similar manner to Example 1. The results were shown in Table 4.

TABLE 4

| Example | A | Cp | $E_{\frac{1}{2}}$ (lux · sec) |
|---|---|---|---|
| 21 | 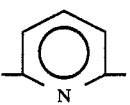 | 15 | 5.6 |
| 22 |  | 17 | 5.3 |
| 23 |  | 24 | 4.4 |
| 24 |  | 25 | 4.5 |
| 25 | 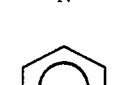 | 27 | 4.8 |
| 26 | 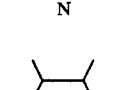 | 2 | 4.8 |

TABLE 4-continued

| Example | A | Cp | $E_{\frac{1}{2}}$ (lux · sec) |
|---|---|---|---|
| 27 | (benzimidazole-type) | 15 | 4.1 |
| 28 | (benzimidazole-type) | 25 | 4.5 |
| 29 | (pyridazine-type) | 24 | 3.2 |
| 30 | (pyridazine-type) | 27 | 3.8 |

EXAMPLES 31–34

Photosensitive members with two layers as a photosensitive layer were prepared in a manner similar to Example 1, except that azo pigments wherein the A component, and the coupler component Cp were those shown in the following Table 5 were used in charge generating layers, and the charge transporting material represented by the following general formula (b);

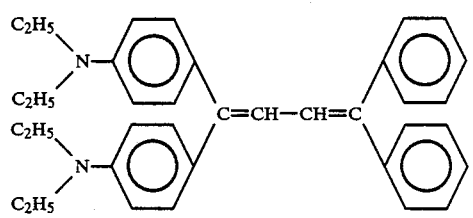
(b)

was used in a charge transporting layer. Cp is represented by the foregoing number [1]–[30] of the chemical formula. The resultant photosensitive members were estimated on exposure values for half reducing ($E_{\frac{1}{2}}$) in a similar manner to Example 1. The results were shown in Table 5.

TABLE 5

| Example | A | Cp | $E_{\frac{1}{2}}$ (lux · sec) |
|---|---|---|---|
| 31 | (pyridazine-type) | 1 | 3.8 |
| 32 | (pyridazine-type) | 2 | 3.2 |
| 33 | (pyridazine-type) | 10 | 3.0 |
| 34 | (pyridazine-type) | 15 | 3.3 |

COMPARATIVE EXAMPLE 1

A photosensitive member with two layers as a photosensitive layer was prepared in a manner similar to Example 1, except that the compound of the chemical formula (c) below;

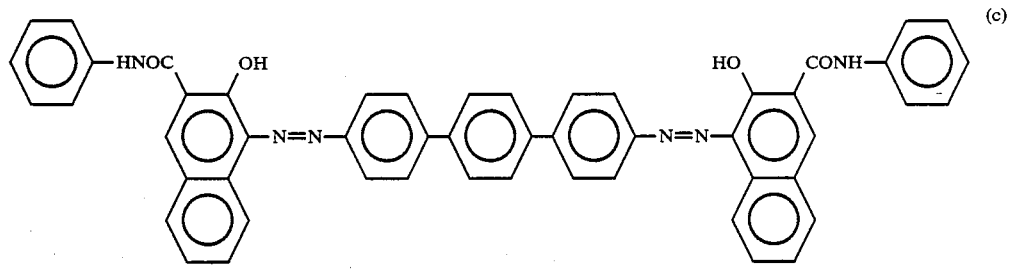
(c)

was used as a charge generating material. The resultant photosensitive member was estimated on exposure value for half reducing ($E_{\frac{1}{2}}$) in a similar manner to Example 1. $E_{\frac{1}{2}}$ was 14.7 (lux·sec).

COMPARATIVE EXAMPLE 2

A photosensitive member with two layers as a photosensitive layer was prepared in a manner similar to Example 1, except that the compound of the chemical formula (d) below;

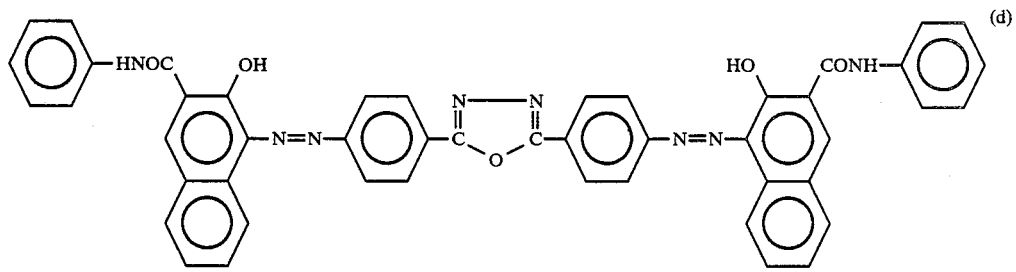

was used as a charge generating material. The resultant photosensitive member was estimated on exposure value for half reducing ($E_{\frac{1}{2}}$) in a similar manner to Example 1. $E_{\frac{1}{2}}$ was 9.4 (lux·sec).

COMPARATIVE EXAMPLES 3

A photosensitive member with two layers as a photosensitive layer was prepared in a manner similar to Example 1, except that the compound of the chemical formula (e) below;

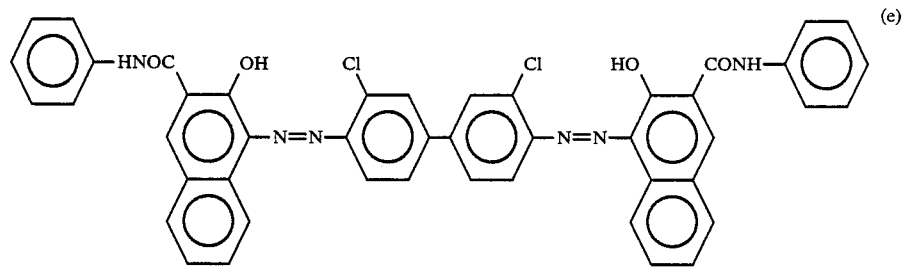

was used as a charge generating material. The resultant photosensitive member was estimated on exposure value for half reducing ($E_{\frac{1}{2}}$) in a similar manner to Example 1. $E_{\frac{1}{2}}$ was 6.3 (lux·sec).

COMPARATIVE EXAMPLE 4

A photosensitive member with two layers as a photosensitive layer was prepared in a manner similar to Example 1, except that the compound of the chemical formula (f) below;

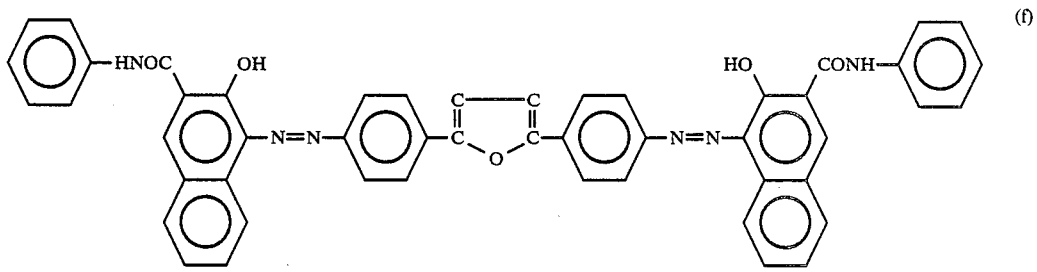

was used as a charge generating material. The resultant photosensitive member was estimated on exposure value for half reducing ($E_{\frac{1}{2}}$) in a similar manner to Example 1. $E_{\frac{1}{2}}$ was 12.5 (lux·sec).

COMPARATIVE EXAMPLE 5

A photosensitive member with two layers as a photosensitive layer was prepared in a manner similar to Example 1, except that the compound of the chemical formula (g) below;

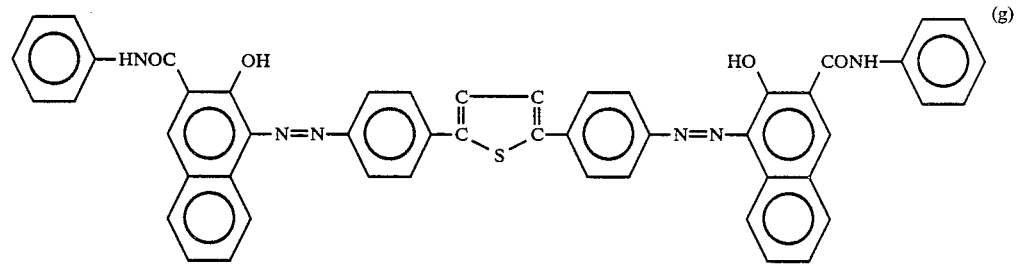

was used as a charge generating material. The resultant photosensitive member was estimated on exposure value for half reducing ($E_{\frac{1}{2}}$) in a similar manner to Example 1. $E_{\frac{1}{2}}$ was 13.7 (lux·sec).

COMPARATIVE EXAMPLE 6

A photosensitive member with two layers as a photosensitive layer was prepared in a manner similar to Example 1, except that the compound of the chemical formula (h) below;

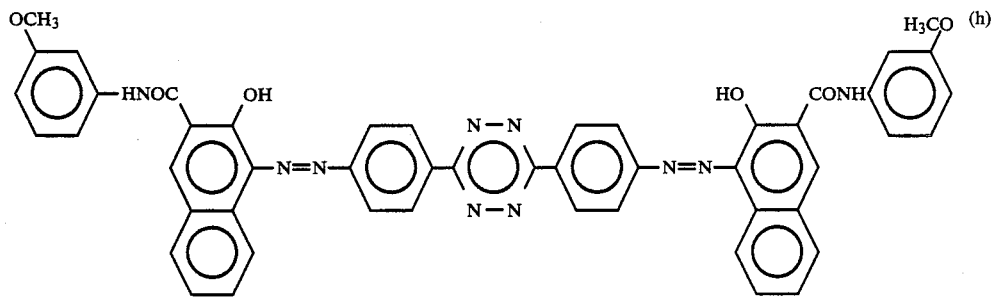

was used as a charge generating material. The resultant photosensitive member was estimated on exposure value for half reducing ($E_{\frac{1}{2}}$) in a similar manner to Example 1. $E_{\frac{1}{2}}$ was 14.7 (lux·sec).

As described above, photosensitive members in Examples 1-34 were more excellent in electrophotographic properties, in particular, sensitivity than those of in Comparative examples because exposure values for half reducing ($E_{\frac{1}{2}}$) of photosensitive members of the Examples were much lower than those of the Comparative Examples. Further, the spectral sensitivity extends to long wavelength. Accordingly, an azo pigment used in the invention has also good sensitivity at the region of long wavelength and it can be applied to a laser printer, a LED printer, a liquid-crystal printer and the like.

What is claimed is:

1. A photosensitive member with a photosensitive layer on or over an electrically conductive substrate wherein the photosensitive member comprises one or more than one of azo pigments represented by the general formula [I];

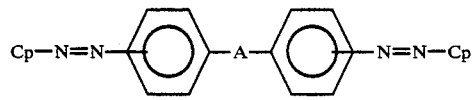

wherein A is a bivalent group selected from the group consisting of naphthalene ring, anthracene ring, fluorene ring, pyridine ring, pyridazine ring, quinoxaline ring, quinoline ring, phenanthrene ring, dihydroanthracene ring, pyrazine ring and pyrene ring wherein each of said rings may have a substituent; and Cp is a residual group of a coupler.

2. A photosensitive member with a photosensitive layer of function-divided type comprising a charge generating layer and a charge transporting layer on or over a electrically conductive substrate, wherein the charge generating layer comprises one or more than one of azo pigments represented by the general formula [I];

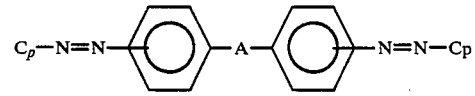

wherein A is a bivalent group selected from the group consisting of naphthalene ring, anthracene ring, fluorene ring, pyridine ring, pyridazine ring, quinozaline ring, quinoline ring, phenanthrene ring, dihydroanthracene ring, pyrazine ring and pyrene ring wherein each of said rings may have a substituent; and Cp is a residual group of a coupler.

3. A photosensitive member of claim 2, wherein the charge generating layer has the azo pigment dispersed in a binder resin.

4. A photosensitive member of claim 3, wherein the charge generating layer has 4 μm or less in thickness.

5. A photosensitive member of claim 3, wherein the charge generating layer has 2 μm or less in thickness.

6. A photosensitive member of claim 3, wherein the charge transporting layer has the charge transporting material dispersed in a binder resin.

7. A photosensitive member of claim 6, wherein the charge transporting layer has 3–30 μm in thickness.

8. A photosensitive member of claim 6, wherein the charge transporting layer has 5–20 μm in thickness.

9. A photosensitive member of claim 6, wherein the charge transporting material is contained at the content of 0.2–2 parts by weight on the basis of one part by weight of the binder resin.

10. A photosensitive member of claim 6, wherein the charge transporting material is contained at the content of 0.3–1.3 parts by weight on the basis of one part by weight of the binder resin.

11. A photosensitive member of claim 6, wherein the charge transporting material is selected from the group consisting of hydrazone compounds, stilbene compounds and carbazole compounds.

12. A photosensitive member of claim 2, wherein the charge generating layer is formed by a vapor-depositing method.

13. A photosensitive member of claim 2, further comprising a surface protective layer.

14. A photosensitive member of claim 2, further comprising a intermediate layer between the charge generating layer and the electrically conductive substrate.

15. A photosensitive member of claim 2, further comprising an intermediate layer between the charge transporting layer and the electrically conductive substrate.

16. A photosensitive member with a photosensitive layer of monolayer type on or over an electrically conductive substrate wherein the photosensitive layer comprises one or more than one of azo pigments represented by the general formula [I];

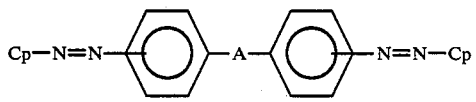 [I]

wherein A is a bivalent group selected from the group consisting of naphthalene ring, anthracene ring, fluorene ring, pyridine ring, pyridazine ring, quinoxaline ring, quinoline ring, phenanthrene ring, dihydroanthracene ring, pyrazine ring and pyrene ring wherein each of said rings may have a substituent; and Cp is a residual group of a coupler.

17. A photosensitive member of claim 16, wherein the photosensitive layer is 3–30 $\mu$m in thickness.

18. A photosensitive member of claim 16, wherein the photosensitive layer is 5–20 $\mu$m in thickness.

19. A photosensitive member of claim 16 or claim 17, the azo pigment is contained at the content of 0.01–3 parts by weight on the basis of one part by weight of the binder resin.

20. A photosensitive member of claim 16 or claim 17, the azo pigment is contained at the content of 0.2–2 parts by weight on the basis of one part by weight of the binder resin.

UNITED STATES PATENT AND TRADEMARK OFFICE
CERTIFICATE OF CORRECTION

PATENT NO. : 4,956,255

DATED : September 11, 1990

INVENTOR(S) : Hideaki UEDA

It is certified that error appears in the above-identified patent and that said Letters Patent is hereby corrected as shown below:

ON TITLE PAGE:

[75] Inventor: Hideaki Ueda, Osaka, Japan.

Signed and Sealed this

Twenty-first Day of July, 1992

Attest:

DOUGLAS B. COMER

Attesting Officer          Acting Commissioner of Patents and Trademarks